United States Patent
Heikfolk et al.

(10) Patent No.: US 11,692,632 B2
(45) Date of Patent: Jul. 4, 2023

(54) SEALING ARRANGEMENT FOR AN ELECTRIC MACHINE, MANUFACTURING METHOD OF SEALING AND SEALING METHOD

(71) Applicant: ABB Schweiz AG, Baden (CH)

(72) Inventors: Kari Heikfolk, Vaasa (FI); Christian Vägar, Vaasa (FI)

(73) Assignee: ABB Schweiz AG, Baden (CH)

( * ) Notice: Subject to any disclaimer, the term of this patent is extended or adjusted under 35 U.S.C. 154(b) by 247 days.

(21) Appl. No.: 17/134,688

(22) Filed: Dec. 28, 2020

(65) Prior Publication Data

US 2021/0116035 A1 Apr. 22, 2021

Related U.S. Application Data

(63) Continuation of application No. PCT/EP2019/066762, filed on Jun. 25, 2019.

(30) Foreign Application Priority Data

Jun. 28, 2018 (EP) .................................. 18180270

(51) Int. Cl.
| | |
|---|---|
| F16J 15/447 | (2006.01) |
| F16J 15/00 | (2006.01) |
| F16J 15/3208 | (2016.01) |

(52) U.S. Cl.
CPC ......... *F16J 15/4476* (2013.01); *F16J 15/002* (2013.01); *F16J 15/3208* (2013.01); *F16J 15/447* (2013.01)

(58) Field of Classification Search
CPC ...... F16J 15/002; F16J 15/008; F16J 15/3208; F16J 15/3216; F16J 15/3248;
(Continued)

(56) References Cited

U.S. PATENT DOCUMENTS

| | | | | |
|---|---|---|---|---|
| 4,185,838 A | * | 1/1980 | Danner | F16J 15/3264 277/412 |
| 8,191,900 B2 | * | 6/2012 | Suzuki | F16J 15/3264 277/553 |

(Continued)

FOREIGN PATENT DOCUMENTS

| | | |
|---|---|---|
| CN | 105370890 A | 3/2016 |
| CN | 105927737 A | 9/2016 |

(Continued)

OTHER PUBLICATIONS

European Patent Office, International Preliminary Report on Patentability issued in corresponding Application No. PCT/EP2019/066762, dated Sep. 7, 2020, 14 pp.

(Continued)

*Primary Examiner* — Nicholas L Foster
(74) *Attorney, Agent, or Firm* — Leydig, Voit & Mayer, Ltd.

(57) ABSTRACT

A sealing arrangement for an electric machine, which is between a first part attached to a rotatable shaft and a second part immobile with respect to a stator of the electric machine includes a plurality of zig-zag sections of a channel of a labyrinth seal in a radial direction of the electric machine. The channel of the labyrinth seal includes a second seal which is fixedly attached to the first part and which has an elastic material part, the second seal is pressed in the radial direction against a surface of the second part, a normal of which has a component parallel to the radial direction, at rotational speeds a centrifugal force of which to the second seal is weaker than a spring force of the second seal, and the second seal opening a gap between the second seal and said surface at rotational speeds the centrifugal force of which to the second seal is greater than the spring force of the second seal.

11 Claims, 5 Drawing Sheets

(58) Field of Classification Search
CPC .... F16J 15/3252; F16J 15/3268; F16J 15/447;
F16J 15/4472; F16J 15/4476
See application file for complete search history.

(56) References Cited

U.S. PATENT DOCUMENTS

| | | | |
|---|---|---|---|
| 9,182,041 B2 | 11/2015 | Daub et al. | |
| 9,915,349 B2 * | 3/2018 | Broadbent | ........... F16J 15/3256 |
| 2015/0001810 A1 * | 1/2015 | Broadbent | ........... F16J 15/3256 |
| | | | 277/402 |

FOREIGN PATENT DOCUMENTS

| | | | | |
|---|---|---|---|---|
| DE | 2322458 A1 | | 11/1974 | |
| EP | 2497977 A1 * | | 9/2012 | ............. F16J 15/008 |
| EP | 3862598 A1 * | | 8/2021 | |
| WO | 2009040519 A1 | | 4/2009 | |

OTHER PUBLICATIONS

European Patent Office, International Search Report & Written Opinion issued in corresponding Application No. PCT/EP2019/066762, dated Jul. 18, 2019, 10 pp.

European Patent Office, Search Report issued in corresponding Application No. 18180270.3, dated Dec. 4, 2018, 2 pp.

Indian Patent Office, Examination Report issued in corresponding Application No. 202047053430, dated Feb. 26, 2021, 5 pp.

China National Intellectual Property Administration, Office Action in Chinese Patent Application No. 201980038963.1, 17 pp. (dated May 20, 2022).

* cited by examiner

SEALING ARRANGEMENT FOR AN ELECTRIC MACHINE, MANUFACTURING METHOD OF SEALING AND SEALING METHOD

FIELD

The invention relates to a sealing arrangement for an electric machine, a manufacturing method of sealing and a sealing method.

BACKGROUND

Existing solutions of sealing of an output shaft of an electric machine such as an electric motor or engine with labyrinth seals or friction seals do not give a sufficient tightness or they have a limited lifespan, particularly in extreme environmental conditions, for example. Conventional radial seals are not suitable for high speed and grease lubrication, because their friction tend to cause heating which limits their use, and conventional labyrinth seals are not perfectly sealing against fluids at standstill. Hence, there is a need to improve the sealing.

BRIEF DESCRIPTION

The invention is defined by the independent claims. Embodiments are defined in the dependent claims.

LIST OF DRAWINGS

Example embodiments of the present invention are described below, by way of example only, with reference to the accompanying drawings, in which FIG. 1 illustrates an example of seals of an electric machine at slow speeds or at stop;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. All combinations of the embodiments are considered possible if their combination does not lead to structural or logical contradiction.

It should be noted that while Figures illustrate various embodiments, they are simplified diagrams that only show some structures and/or functional entities. The connections shown in the Figures may refer to logical or physical connections. It is apparent to a person skilled in the art that the described apparatus may also comprise other functions and structures than those described in Figures and text. It should be appreciated that details of some functions, structures, and the signalling used for measurement and/or controlling are irrelevant to the actual invention. Therefore, they need not be discussed in more detail here.

Figure 1:
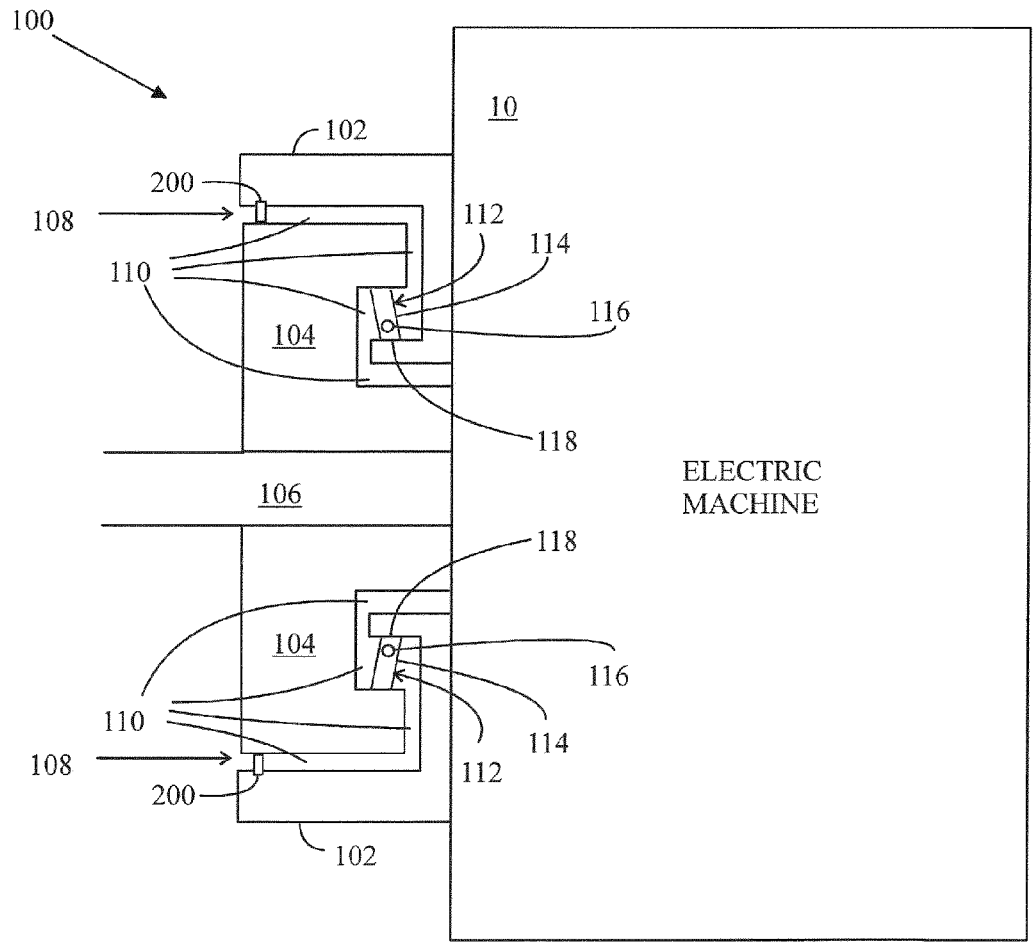

FIG. 1 illustrates a cross section of a simplified example of a sealing arrangement 100 of an electric machine 10 when the electric machine 10 is stopped or running slowly. The sealing arrangement 100 is located between a first part 104 attached to the shaft 106 and a second part 102 immobile with respect to a stator of the electric machine 10. The first part 104 is mobile and it rotates with a rotating shaft 106 of the electric machine 10 while the electric machine 10 is run. In an embodiment, the electric machine 10 may comprise an electric motor or electric engine, which consumes electric energy, or an electric generator, which produces electric energy. The sealing arrangement 100 comprises a plurality of zig-zag sections 110 of a structurally continuous labyrinth seal 108 in a radial direction of the electric machine 10 between the first and second parts 102, 104. The labyrinth seal 108 that is a channel between the first and second parts 102, 104 continues round a rotatable shaft 106 of the electric machine 10. A distance between the first and the second parts 102, 104 may be from tens of millimeters to millimeters, the distance being a width of the channel. The first and second parts 102, 104, in turn, may be ring-shaped elements of an end housing of the electric machine 10. The first and second parts 102, 104 may be made on one or more sub-parts. The radial direction is parallel to the centrifugal force experienced by any object when rotating with the rotating shaft 106.

A plurality of longitudinal axes of the zig-zag sections 110 have different directions in the same cross sectional plane. The directions of the successive sections 110 thus differ from each other, and may be perpendicular with respect to each other. A part of the longitudinal axes of a common cross section of the zig-zag sections 110 may be parallel to the axis of the shaft 106 on the electric machine 100 and a part of the longitudinal axes of the common cross section of the zig-zag sections 110 may be parallel to a radial direction. However, also other directions may be possible. Different ends of the labyrinth seal 108 have different distances from the rotational axis which causes a radial centrifugal force to water, lubricant, dust or any other material in the labyrinth seal 108. The centrifugal force, in turn, thus prevents or limits any undesirable material from entering the labyrinth seal 108.

The labyrinth seal 108 includes in its channel a second seal 112 which is fixedly attached to the first part 104 rotatable with the shaft 106. The second seal 112 comprises an elastic material part 114. In an embodiment, the second seal 112 may also comprise a spring part 116. The second seal 112 has a ring shape and it is located within a ring shaped, enlarged cavity of the channel of the labyrinth seal 108. The elastic material part 114 may comprise polymer and/or rubber, for example. The spring part 116 may comprise polymer, rubber and/or metal, for example. The metal may be steel, for example. The elastic part 114 is pressed, in the radial direction towards the shaft 106, against a surface 118 of the second part 102 at rotational speeds a centrifugal force of which to the second seal 112 is weaker than a spring force of second seal 112. A normal of the surface 118 has a component parallel to the radial direction.

The elastic part 114 and the spring part 116 may press, in the radial direction, the elastic material part 114 against the surface 118 of the second part 102 at rotational speeds a centrifugal force of which to the second seal 112 is weaker than a spring force of the spring part 116 and the potential spring force of the elastic material part 114. A normal of the surface 118 has a component parallel to the radial direction.

Figure 2:
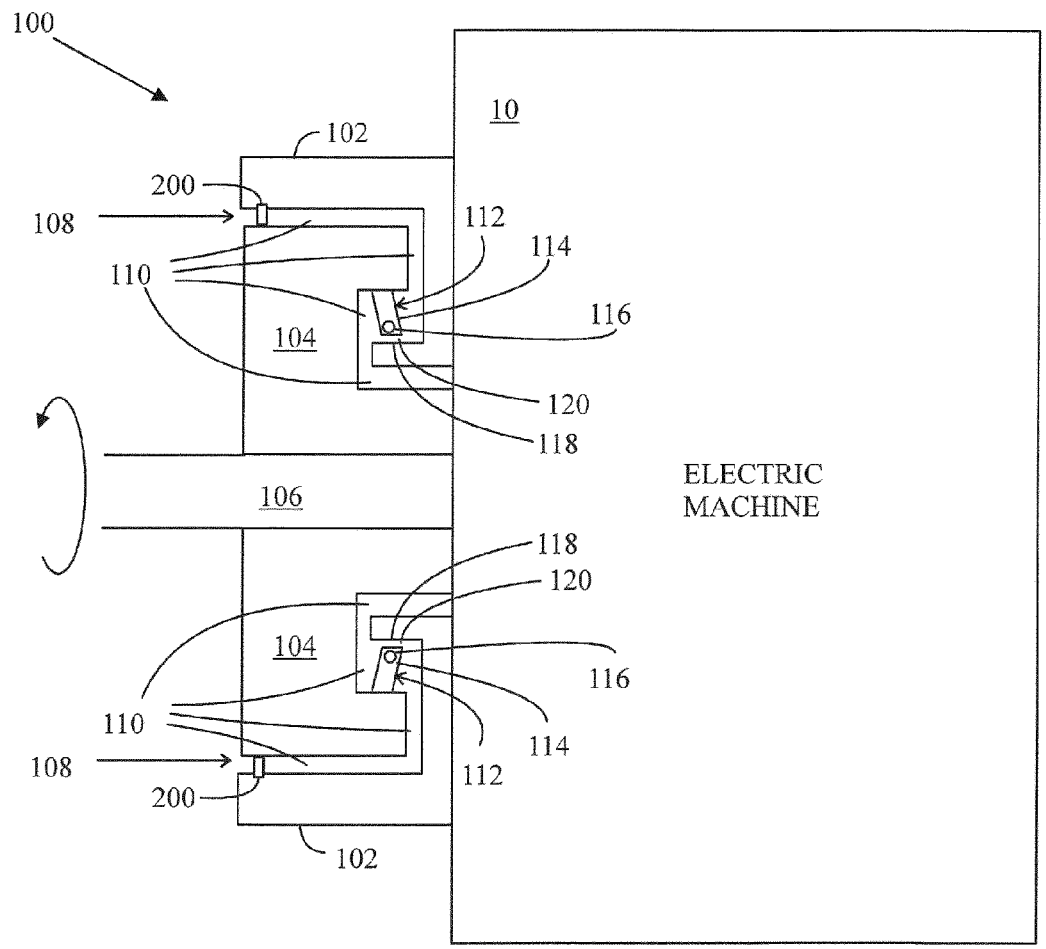
FIG. 2 illustrates an example of seals of the electric machine at higher speeds.

As shown in FIG. 2, a gap 120 opens between the second seal 112 and said surface 118 at rotational speeds the centrifugal force of which to the second seal 112 is greater than the spring force of the second seal 112. In this manner, friction and heat caused by the friction is reduced or eliminated. The second seal 112 converts to a clearance seal when the gap 120 opens.

In an embodiment, the channel of the labyrinth seal 108 may include a dust and particle seal 200 between a radial outer end of the channel and the second seal 112. The dust and particle seal 200 may also be called a gadget seal or a clearance seal. The dust and particle seal 200 prevents dust and particles from entering the labyrinth seal 108. The radial outer end of the labyrinth seal 108 refers to the radially farthest point from the shaft 106 or the rotational axis of the electric machine 10. The dust and particle seal 200 may be made from felt, polymer, plastic, rubber, silicone, fiberglass or the like, for example.

Figure 3:
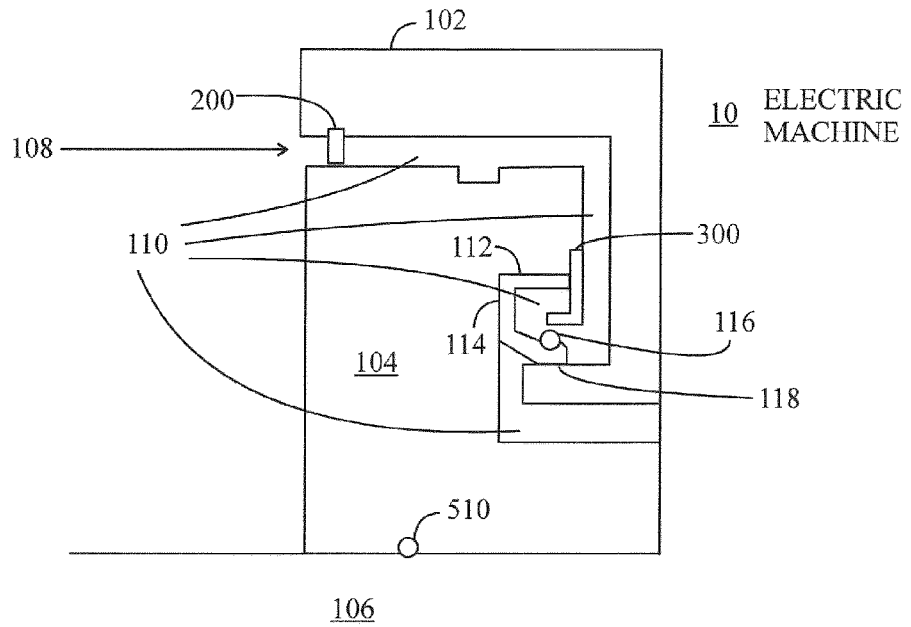
FIG. 3 illustrates an example of dust and particle seal and another shape of a second seal at slow speeds or at stop.
Figure 4:
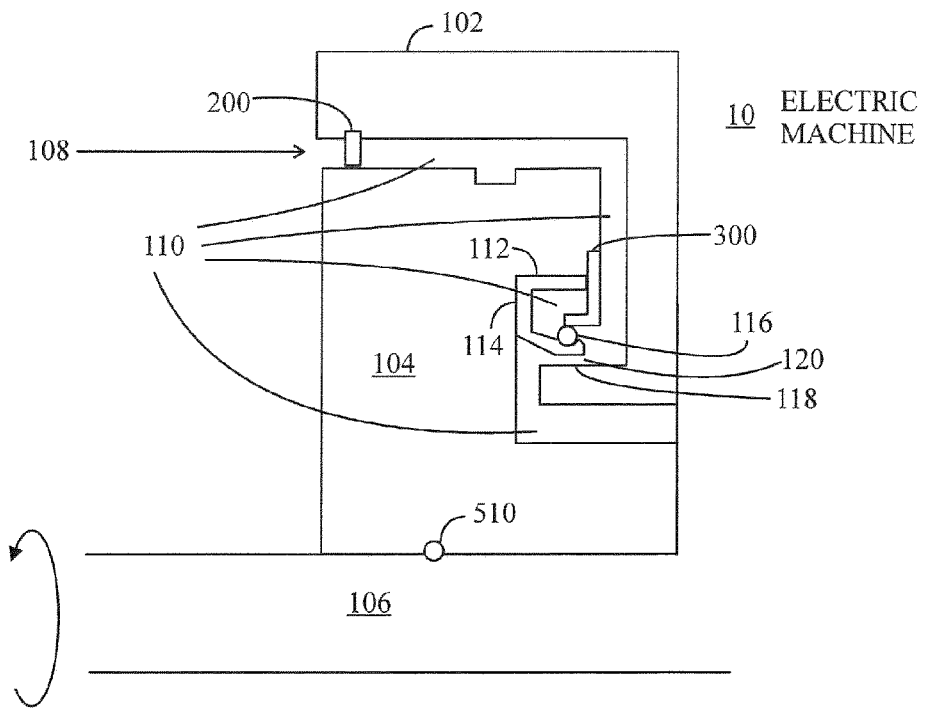
FIG. 4 illustrates an example of dust and particle seal and another shape of a second seal at higher speeds.

In an embodiment examples of which are illustrated in FIGS. 3 and 4, the sealing arrangement may have a limiter 300 within the channel of the labyrinth seal 108. In FIGS. 3 and 4, the second seal 112 has a shape resembling that of the letter u which is put on its side. One side and the bottom of the seal 112 are attached to the first part 104. In FIG. 3, another side is in contact with the second part 102 because of the spring force and slow or no rotation of the electric machine 10. In FIG. 4, there is the gap 12 between the second seal 112 and the second part 102 because of high enough a rotation speed of the electric machine 10. The limiter 300 limits a radial movement of the second seal 112 caused by the centrifugal force. The limiter 300 thus limits a maximum size of the gap 120. Because of the limitation of the radial movement of the second seal 112, the second seal 112 stays put and is thus effective and long lasting.

In an embodiment, the sealing arrangement may comprise a lubricant transfer hole 500 which may form a connection between the channel of the labyrinth seal 108 and a bearing of the electric machine 10 and receive used lubricant from the bearing. The hole 500 may be in in an axial direction. The sealing arrangement may comprise an output hole 502 for expulsing the used lubricant which has entered the labyrinth seal 108. The expulsion depends on rotation speed of the electric machine 100 and thus the centrifugal force which pushes the lubricant outwards through the opening of the labyrinth seal 108 which is radially further away from the rotational axis. The lubricant may be grease, oil or the like for reducing friction in the bearing.

Figure 5:
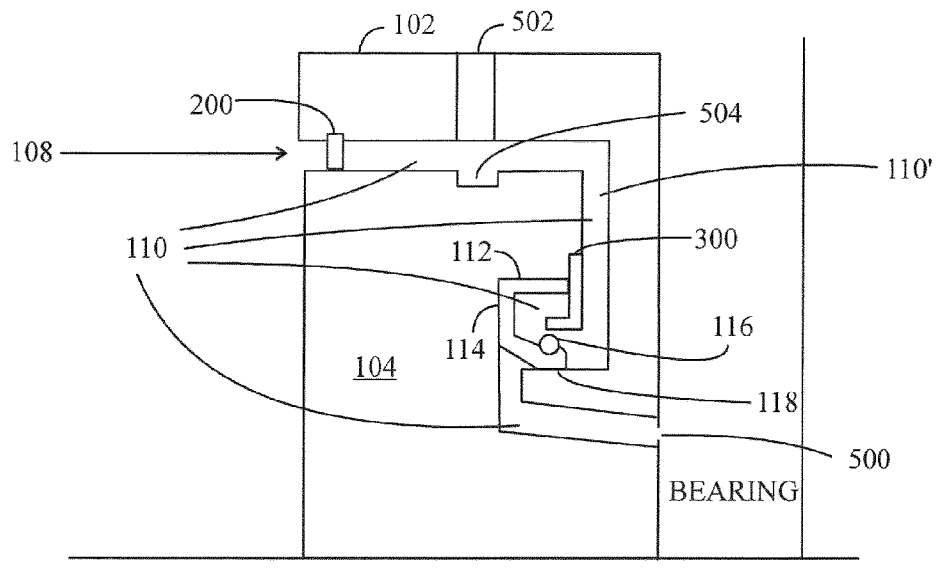
FIG. 5 illustrates an example of a transfer hole between a labyrinth seal and a bearing.

In an embodiment illustrated in FIG. 5, the lubricant transfer hole 500 may be at a radial inner end of the channel of the labyrinth seal 108. That is, the lubricant transfer hole 500 may be close or adjacent to the shaft 106. Also in this case, the centrifugal force pushes the lubricant outwards through the opening of the labyrinth seal 108 which is radially further away from the rotational axis. Lubrication of the bearing may be performed while the electric machine 10 is running.

In an embodiment illustrated in FIG. 5, the channel of the labyrinth seal 108 may be tapered between the second seal 112 and the radial inner end. In an embodiment, the channel of the labyrinth seal 108 may be tilted between the second seal 112 and the lubricant transfer hole 500. The tilt makes it easier to remove the lubricant from the labyrinth seal 108 with the centrifugal force. In an embodiment, the channel of the labyrinth seal 112 may comprise a groove 504 between a radial outer end and the second seal 112. In an embodiment, the ring-shaped groove 504 may reside between the gasket seal 200 and the second seal 112. In an embodiment, the output hole 502 may face the groove 504.

In an embodiment, the groove 504 may be in the first part 104 rotatable with respect to a shaft 106 of the electric machine 10.

In an embodiment, the groove 504 may be in a section 110 of the channel of the labyrinth seal 108 a normal of which has a component parallel to the radial direction.

In an embodiment, a radial section 110' of the channel of the labyrinth seal 108 between the outer end of the labyrinth seal 108 and the second seal 112 is the longest of the plurality of sections 110. In this manner, the centrifugal force is strong and keeps dust, water and all other undesired stuff away from the electric machine 10 when the electric engine 10 is running. The gap 120 closed by the second seal 112 on the basis of the spring force, in turn, keeps dust, water and all other undesired stuff away from the electric machine 10 when the electric engine 10 is running slowly or has been stopped.

In an embodiment illustrated in FIGS. 3 and 4, an O-ring 510 may be used between the shaft 106 and the first part 104. The O-ring 510 may be made of metal. In an embodiment, the O-ring 510 may be made of polymer or rubber, for example.

Figure 6:
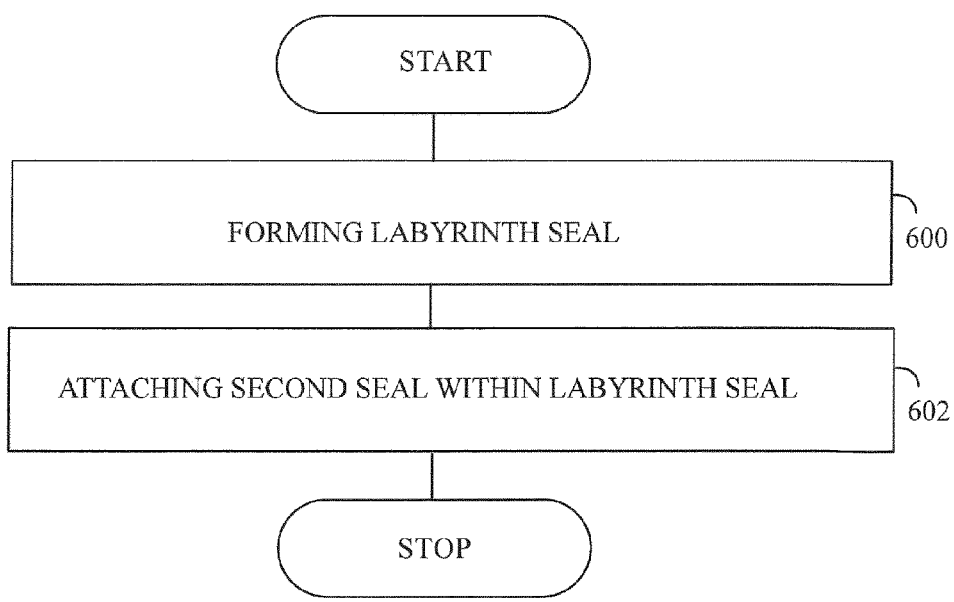
FIG. 6 illustrates an example of a flow chart of a manufacturing method of the sealing of the electric machine.

FIG. 6 is a flow chart of the manufacturing method for the sealing. In step 600, a plurality of zig-zag sections 110 of a labyrinth seal 108 are formed between a first part 104 attached to a rotatable shaft 106 and a second part 102 immobile with respect to a stator of the electric machine 10 in a radial direction of the electric machine 10. In step 602, a second seal 112 is attached to the first part 104 in the channel of the labyrinth seal 108, the second seal 112 comprising an elastic material part 114 which is pressed, by the spring part 116 in the radial direction, the elastic material part 114 against a surface 118 of the second part 102 at rotational speeds a centrifugal force of which to the second seal 112 is weaker than a spring force of the spring part 116, a normal of the surface 118 having a component parallel to the radial direction, and opening a gap 120 between the elastic material part 114 and said surface 118 at rotational speeds the centrifugal force of which to the second seal 112 is greater than the spring force of the spring part 116.

Figure 7:
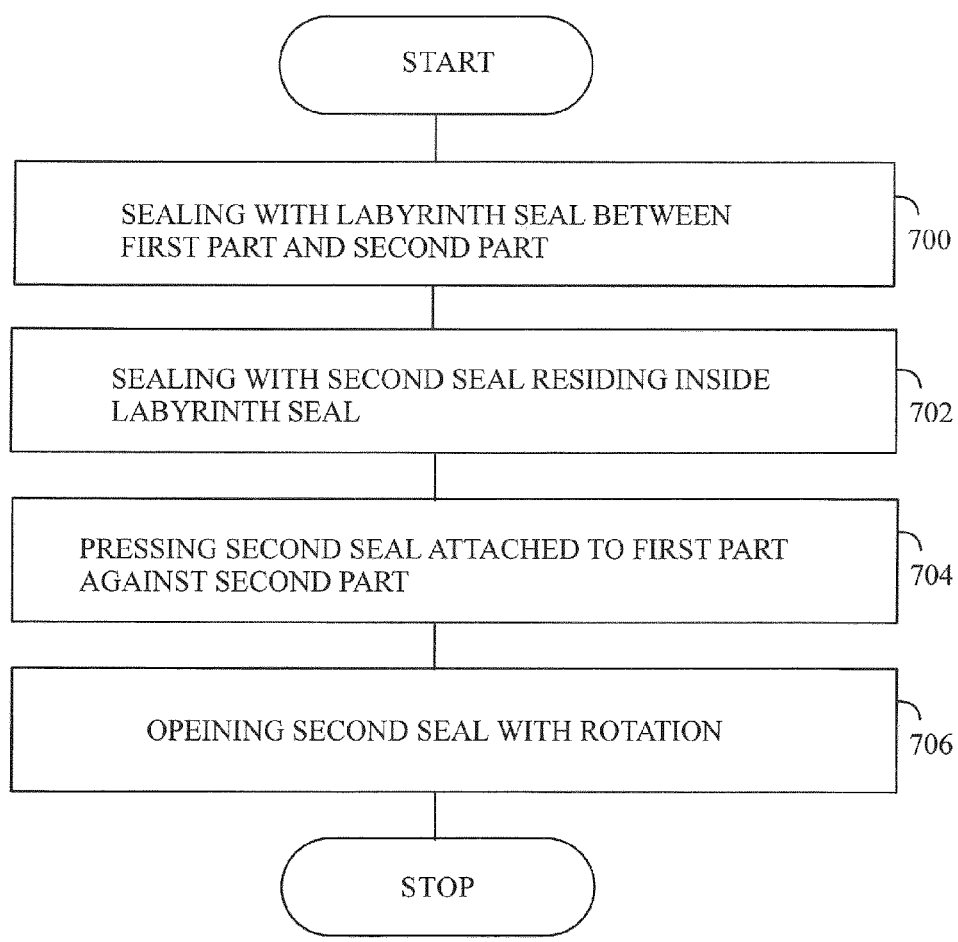
FIG. 7 illustrates of an example of a flow chart of a sealing method.

FIG. 7 is a flow chart of the sealing method of an electric machine. In step 700, first sealing is performed using a plurality of zig-zag sections 110 of a labyrinth seal 108 between a first part 104 attached to a rotatable shaft 106 and a second part 102 immobile with respect to a stator of the electric machine 10 in a radial direction of the electric machine 10. In step 702, second sealing is performed using a second seal 112 attached to the first part 104, the second seal 112 residing within the channel of the labyrinth seal 108 and comprising an elastic material part 114. In step 704, the elastic material part 114 is pressed against a surface 118 of the second part 102 at rotational speeds a centrifugal force of which to the second seal 112 is weaker than a spring force of the second seal 112 in the radial direction by the spring part 116, a normal of the surface 118 having a component parallel to the radial direction. In step 706, a gap 120 is opened between the elastic material part 114 and said surface 118 at rotational speeds the centrifugal force of which to the second seal 112 is greater than the spring force of the second seal 112.

It will be obvious to a person skilled in the art that, as technology advances, the inventive concept can be implemented in various ways. The invention and its embodiments are not limited to the example embodiments described above but may vary within the scope of the claims.

The invention claimed is:

1. A sealing arrangement for an electric machine, comprising:
   a first part attached to a rotatable shaft and a second part immobile with respect to a stator of the electric machine, wherein a plurality of zig-zag sections of a channel of a labyrinth seal in a radial direction of the electric machine are formed between the first part and the second part;
   the channel of the labyrinth seal includes a second seal which is fixedly attached to the first part and which has an elastic material part, the second seal being configured to press in the radial direction against a surface of the second part, a normal of which has a component parallel to the radial direction, at a first rotational speed where a centrifugal force acting on the second seal is weaker than an opposing spring force of the second seal, and the second seal being configured to open a gap between the second seal and said surface at a second rotational speed where the centrifugal force acting on the second seal is greater than the opposing spring force of the second seal; and
   the sealing arrangement comprises a limiter attached to the first part at a position farther from a rotational axis than a position at which the second seal is attached within the channel of the labyrinth seal, the limiter being configured to limit a radial movement of the second seal on the basis of the centrifugal force thereby liming a maximum size of the gap,
   wherein the channel of the labyrinth seal includes a gasket seal between a radial outer end of the labyrinth seal and the second seal.

2. The sealing arrangement of claim 1, wherein the sealing arrangement comprises a lubricant transfer hole which is configured to form a connection between the channel of the labyrinth seal and a bearing of the electric machine and receive used lubricant from the bearing, and the sealing arrangement comprises an output hole configured to expulse the used lubricant from the labyrinth seal.

3. The sealing arrangement of claim 2, wherein the lubricant transfer hole is at a radial inner end of the labyrinth seal.

4. The sealing arrangement of claim 1, wherein the channel of the labyrinth seal is tilted between the second seal and a radial inner end of the labyrinth seal.

5. The sealing arrangement of claim 2, wherein the channel of the labyrinth seal comprises a groove between a radial outer end of the labyrinth seal and the second seal.

6. The sealing arrangement of claim 5, wherein the groove is in the first part rotatable with the shaft of the electric machine.

7. The sealing arrangement of claim 5, wherein the groove is in a section of the channel a normal of which has a component parallel to the radial direction.

8. The sealing arrangement of claim 1, wherein a radial section of the channel of the labyrinth seal between a radial outer end of the labyrinth seal and the second seal is the longest of the plurality of sections.

9. The sealing arrangement of claim 1, wherein the second seal comprises a spring part configured to press, in the radial direction, the elastic material part against the surface of the second part, a normal of which has a component parallel to the radial direction.

10. A method of manufacturing a sealing arrangement for an electric machine, the method comprising:
    forming a plurality of zig-zag sections of a labyrinth seal between a first part attached to a rotatable shaft and a second part configured to be immobile with respect to a stator of the electric machine in a radial direction of the electric machine;
    attaching a second seal to the first part, the second seal comprising an elastic material part for pressing, in the radial direction, against a surface of the second part at a first rotational speed where a centrifugal force acting on the second seal is weaker than an opposing spring force of the second seal, a normal of the surface having a component parallel to the radial direction, and opening a gap between the second seal and said surface at a second rotational speed where the centrifugal force acting on the second seal is greater than the opposing spring force of the second seal;
    including a limiter attached to the first part, the limiter being configured for arrangement at a first position from a rotational axis within the channel of the labyrinth seal, wherein the second seal is configured for arrangement at a second position from the rotational axis within the channel of the labyrinth seal and the first position is farther from the rotational axis than the second position, the limiter being configured to limit a radial movement of the second seal on the basis of the centrifugal force thereby liming a maximum size of the gap; and
    providing a gasket seal in the channel of the labyrinth seal between a radial outer end of the labyrinth seal and the second seal.

11. A method of sealing an electric machine, the method comprising:
    performing first sealing by a plurality of zig-zag sections of a labyrinth seal between a first part attached to a rotatable shaft and a second part configured to be immobile with respect to a stator of the electric machine in a radial direction of the electric machine;
    performing second sealing by a second seal attached to the first part and residing within the channel of the labyrinth seal, the second seal comprising an elastic material part;
    pressing the elastic material part in the radial direction against a surface of the second part at a first rotational speed where a centrifugal force acting on the second seal is weaker than an opposing spring force of the second seal, a normal of the surface having a component parallel to the radial direction;
    opening a gap between the elastic material part and said surface at a second rotational speed where the centrifugal force acting on the second seal is greater than the opposing spring force of the second seal;
    limiting, by a limiter attached to the first part at a position farther from a rotational axis than a position at which the second seal is attached within the channel of the labyrinth seal, a radial movement of the second seal caused by the centrifugal force thereby liming a maximum size of the gap; and providing a gasket seal in the channel of the labyrinth seal between a radial outer end of the labyrinth seal and the second seal.

* * * * *